(12) United States Patent  (10) Patent No.: US 7,766,104 B2
Newberry et al.  (45) Date of Patent: Aug. 3, 2010

(54) DIFFERENTIAL LOCK CONTROL IN ARTICULATED MACHINE

(75) Inventors: Phillip A. Newberry, Taylorville, IL (US); Imed Gharsalli, Brimfield, IL (US)

(73) Assignee: Caterpillar Inc, Peoria, IL (US)

( * ) Notice: Subject to any disclaimer, the term of this patent is extended or adjusted under 35 U.S.C. 154(b) by 938 days.

(21) Appl. No.: 11/408,018

(22) Filed: Apr. 20, 2006

(65) Prior Publication Data

US 2007/0250236 A1 Oct. 25, 2007

(51) Int. Cl.
*B60K 28/16* (2006.01)

(52) U.S. Cl. .................. 180/24.09; 180/197; 180/338

(58) Field of Classification Search ............ 180/22, 180/23, 24, 24.01, 24.03, 24.04, 24.1, 24.09, 180/338, 418, 419, 197, 249, 253, 271, 6.44; 701/51, 83, 50, 88; 8/150.5; 101/326; 114/12; 475/213, 84, 86; 477/92; 303/156
See application file for complete search history.

(56) References Cited

U.S. PATENT DOCUMENTS

| | | | |
|---|---|---|---|
| 4,162,712 A * | 7/1979 | Nelson | 180/253 |
| 4,549,448 A * | 10/1985 | Kittle | 180/271 |
| 4,570,509 A | 2/1986 | Nighswonger | |
| 4,589,511 A | 5/1986 | Leiber | |
| 4,775,026 A | 10/1988 | Sollbach et al. | |
| 5,301,769 A | 4/1994 | Weiss | |
| 5,366,042 A | 11/1994 | Wilks et al. | |
| 5,529,136 A | 6/1996 | Zulu | |
| 5,535,124 A * | 7/1996 | Hosseini et al. | 701/83 |
| RE36,152 E | 3/1999 | Hosseini et al. | |
| 5,899,292 A * | 5/1999 | Paul et al. | 180/419 |
| 5,980,415 A | 11/1999 | Showalter | |
| 6,007,454 A | 12/1999 | Takahira et al. | |
| 6,009,969 A * | 1/2000 | Salcher et al. | 180/249 |

(Continued)

FOREIGN PATENT DOCUMENTS

DE 197 49 919 A1 6/1998

(Continued)

OTHER PUBLICATIONS

PCT International Search Report, Applicant Ref. No. 05-285, PCT International No. PCT/US2007/006084; International Filing Date: Mar. 9, 2007; Priority Date: Apr. 20, 2006; Applicant: Caterpillar Inc.

(Continued)

*Primary Examiner*—Eric Culbreth
*Assistant Examiner*—Karen Jane J Amores
(74) *Attorney, Agent, or Firm*—Liell & McNeill

(57) ABSTRACT

A method of operating an articulated machine includes sensing an articulation angle and a wheel steering angle of the machine, and controlling a locking state of a differential responsive to a steering radius of the machine. An articulated frame wheeled machine is further provided, and includes a front frame unit with a wheel steering apparatus, a back frame unit and an articulation apparatus coupled between the front and back frame units. First and second sensors are operable to sense a wheel steering angle and an articulation angle of the machine, and an electronic control is provided which is configured to selectively lock or unlock a differential of the back frame unit responsive to a steering radius of the machine.

20 Claims, 4 Drawing Sheets

U.S. PATENT DOCUMENTS

| | | | |
|---|---|---|---|
| 6,038,506 A * | 3/2000 | Diekhans et al. | 701/88 |
| H1851 H | 6/2000 | Kelley et al. | |
| 6,085,138 A * | 7/2000 | Smith et al. | 701/51 |
| 6,174,255 B1 * | 1/2001 | Porter et al. | 475/84 |
| 6,631,320 B1 | 10/2003 | Holt et al. | |
| 6,668,225 B2 * | 12/2003 | Oh et al. | 701/70 |
| 6,819,980 B2 * | 11/2004 | Bauer et al. | 701/1 |
| 2005/0209763 A1 * | 9/2005 | Offerle et al. | 701/83 |
| 2006/0180371 A1 * | 8/2006 | Breed et al. | 180/197 |
| 2007/0032938 A1 * | 2/2007 | Hrovat et al. | 701/82 |
| 2008/0221771 A1 * | 9/2008 | Olsson | 701/83 |

FOREIGN PATENT DOCUMENTS

| | | |
|---|---|---|
| DE | 19749919 A1 * | 6/1998 |
| EP | 1 090 799 A2 | 4/2001 |
| JP | 2003237619 | 8/2003 |
| JP | 2003237619 A * | 8/2003 |
| WO | WO 2005/100133 A1 | 10/2005 |

OTHER PUBLICATIONS

Fukushima, Differential Lock Switching Device, Patent Abstracts of Japan, Aug. 27, 2003, 1page, 2003237619 A, Japanese Patent Office, Japan.

* cited by examiner

DIFFERENTIAL LOCK CONTROL IN ARTICULATED MACHINE

TECHNICAL FIELD

The present disclosure relates generally to methods and apparatuses for controlling the locking state of a differential in a work machine, and relates more particularly to a method of controlling a locking state of a differential of an articulated work machine that also includes wheel steering.

BACKGROUND

Many modern work machines operate in relatively rugged environments where traction can be difficult to maintain. Work machines such as motor graders must often operate on loose soil, gravel, etc., imparting a tendency for one or more wheels of the work machine to slip as the machine is driven across a work surface. When the work machine is turning, however, it is desirable to allow the wheels to rotate at different speeds, or "differentiate." To this end, most modern work machines include a differential that allows the wheels to rotate at different speeds, in a familiar manner. When low traction conditions are encountered, however, differentiation of the wheels can have the undesired effect of providing motive power or "rim pull" predominantly or solely to a spinning wheel on a given axle, while the other wheel sits idle.

In the past, wheel slip problems have been addressed in a variety of ways. One method of addressing wheel slip problems is to selectively apply a brake to slow a slipping wheel such that rim pull may be returned to the opposite wheel. In one strategy, when slip of one wheel of a particular axle is detected, the operator or an electronic controller can selectively actuate a brake on the subject wheel to slow it down, allowing the spinning wheel to regain some traction and returning power to the opposite wheel. While selective braking systems work well in certain environments, they are not without limitations. One such limitation relates to the heat generated by friction of the brake on components of the wheel, ultimately transmitting heat into the axle. Because of this phenomenon, there are limitations as to how much a wheel can be selectively braked until the temperature exceeds that which the work machine can tolerate. In addition, selective braking obviously results in extra wear and tear on the brakes of the work machine.

Another approach to wheel slip relates to selectively locking the differential of one or more axles of a work machine. As discussed above, during normal operation, the differential allows wheels coupled with the axles to rotate at different speeds, in turn allowing the wheels to rotate independently as the work machine navigates a turn. Both operator controlled and computer controlled systems are known whereby a differential clutch is engaged via an actuator to couple rotation of the wheels of an axle together. Rotationally coupling the wheels together can reduce wheel slip and resultant loss of traction in a well-known manner. A problem inherent to operator controlled differential locks, as well as certain computer controlled systems, is the potential for overuse and under use of the differential locks. In particular, operators are often occupied with a plethora of concerns and controls while operating the work machine, and have been known to give less attention to the differential locks. As a result, the differentials are often locked in situations where they would be better unlocked, and vice versa.

For example, when a work machine with a locked differential is entering a turn, it will typically be desirable to unlock the differential. If the differential remains locked through a turn, the outside wheel and the inside wheel components, including the tires, can each experience significant stress, as can components of the powertrain. In some cases gear teeth on certain of the powertrain gears can actually break. Even worse, where the work machine takes the turn with sufficient speed, an operator's failure to unlock a differential can even cause the work machine to roll over. Despite the undue wear and tear on the machine, many operators opt to keep the differential locked inappropriately rather than risk losing traction and reducing operating efficiency.

On the other hand, where a work machine with an unlocked differential encounters poor underfoot conditions, one of the wheels of each driven axle may spin significantly before the operator decides to activate the differential lock, also resulting in wear on the wheels, tires and powertrain components. Despite wear and tear on the machine resulting from overuse and under use of the differential locks, operators are obviously unable to focus their attention solely on controlling the differential. While it would of course be desirable to strike a perfect balance between wear and tear on the one hand, and operating efficiency on the other, even the most highly skilled operators are not equipped to monitor and control all the aspects of work machine operation that would be necessary to achieve such a goal.

Various electronic control strategies have been developed which automate at least some of the control over the differential locking state in a work machine, allowing the operator to better attend to other machine functions and attempting to reduce overuse and under use of the differential locks. One such strategy is known from Japanese Patent Application Publication No. 2003-237619 to Kenji (hereinafter "Kenji"). Kenji is directed to a differential lock switching device for a work vehicle that switches the locking state of a differential based on a detected articulation angle or a detected wheel steering angle. The development is described primarily in the context of a motor grader having a hydraulic differential lock control valve, apparently for use with a combination pneumatic and hydraulic differential lock. While Kenji provides an approach that will facilitate electronic control over differential locking and unlocking, Kenji's strategy fails to account for many of the machine stress conditions set forth above. Thus, many of the shortcomings inherent in an operator controlled strategy would still inhere in Kenji's approach. Kenji's apparent use of simple wheel steering and articulation thresholds to trigger locking or unlocking also provides only a sometimes appropriate locking and/or unlocking the differential, and therefore sacrifices operating efficiency. Operating efficiency would appear to be less than optimal in particular because Kenji does not appear to vary the thresholds to account for different operating conditions.

The present disclosure is directed to one or more of the problems or shortcomings set forth above.

SUMMARY OF THE DISCLOSURE

In one aspect, the present disclosure provides a method of operating an articulated work machine. The method includes the step of determining a value indicative of an articulation angle of the work machine, and determining another value indicative of a wheel steering angle of the work machine which is separate from the articulation angle. The method further includes the step of controlling a locking state of a differential of the work machine responsive to a steering radius thereof.

In another aspect, the present disclosure provides an articulated work machine. The work machine includes a front frame unit including a wheel steering apparatus operable to steer the work machine, and a back frame unit coupled with the front frame unit and including a lockable differential. The work machine further includes an articulation apparatus coupled between the front frame unit and the back frame unit, also operable to steer the work machine. The work machine further includes an electronic controller configured to control at least one of locking and unlocking of the differential responsive to a steering radius of the work machine.

In still another aspect, the present disclosure provides an electronic controller configured to control a locking state of the differential in an articulated work machine at least in part by comparing a steering radius of the work machine with a minimum steering radius that is based on stress indicia associated with at least one work machine operating parameter.

DETAILED DESCRIPTION

Figure 1:
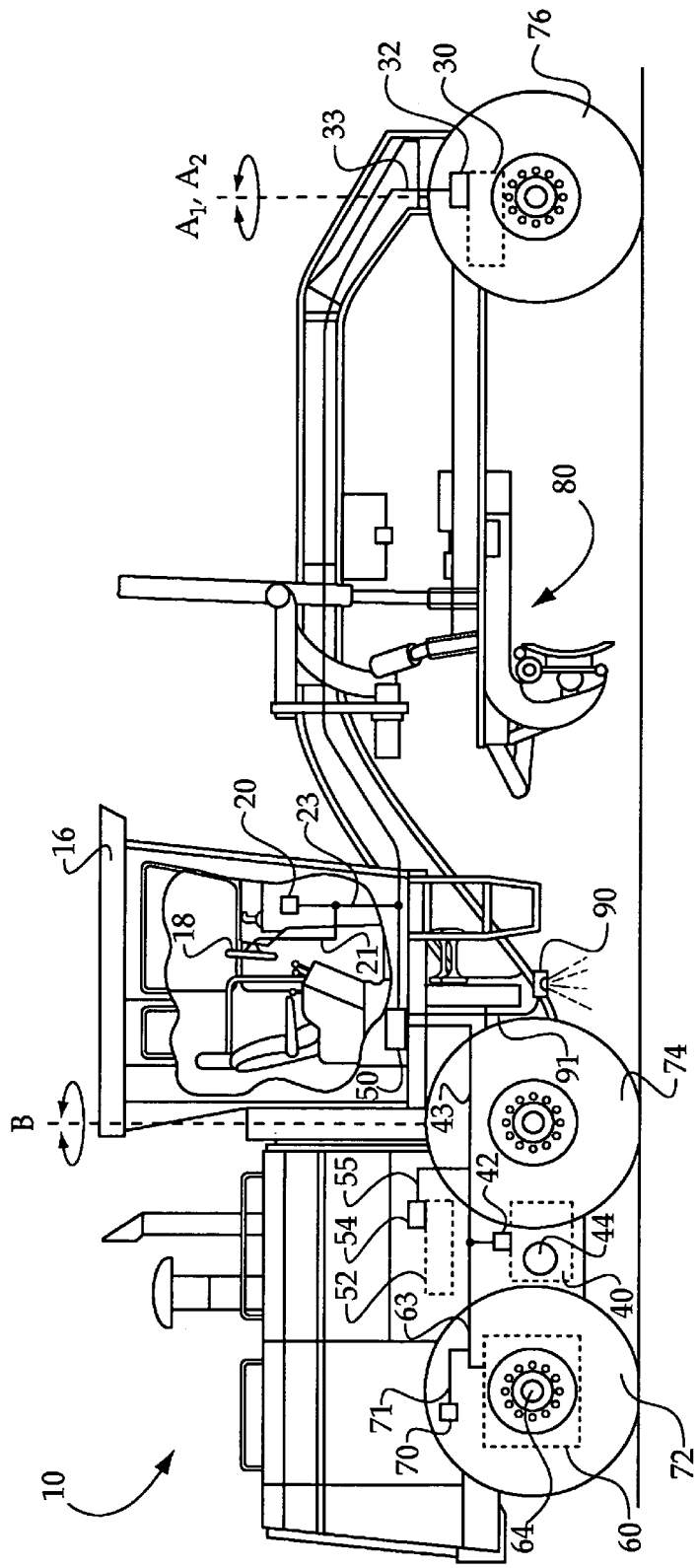
FIG. 1 is a diagrammatic side view of a motor grader work machine according to one embodiment of the present disclosure.

Referring to FIG. 1, there is shown a work machine 10 according to one embodiment of the present disclosure. Work machine 10 is shown in the context of a motor grader having a front frame unit 12 and a back frame unit 14, and an adjustable grader blade assembly 80. Work machine 10 may include an operator cabin 16 having various controls for operating work machine 10, including a steering device 18 such as a steering wheel or steering joystick. Work machine 10 may be steered with a wheel steering apparatus 30 coupled with front wheels 76, which are each rotatable about an axis $A_1$ and $A_2$. Work machine 10 may be further steered by adjusting an articulation angle between front frame unit 12 and back frame unit 14 about an articulation axis B via an articulation apparatus 40, for example including at least one articulation actuator 44. Steering device 18 may be operable to control a wheel steering angle via apparatus 30, while a separate steering control may be provided for adjusting the articulation angle between front and back units 12 and 14, for example a pedal or lever. Work machine 10 may include a back axle 64 having a first set of wheels 72 and a second set of wheels 74. The respective sets of wheels may be mounted in a conventional tandem drive assembly or the like, such that all four wheels may be driven by a single driveshaft of work machine 10. A lockable differential 60 configured to selectively rotatably couple back wheels 72 together is further provided, and has a locking state controlled as described herein. Although work machine 10 is illustrated in the context of a motor grader, those skilled in the art will appreciate that the teachings of the present disclosure may be applicable to other work machines having dual steering means, as described herein.

Various aspects of operation of work machine 10 may be electronically controlled. To this end work machine 10 includes an electronic controller 50 in communication with steering device 18 via a communication line 21. An operator input device 20 which may be a differential locking control button, lever or pedal, for example, is also positioned in operator cabin 16 and may be electronically connected with electronic controller 50 via another communication line 23. Lockable differential 60 will typically be controlled by electronic controller 50 and coupled therewith via yet another communication line 63. Although it is contemplated that work machine 10 will always include means for electronically controlling the locking state of differential 60, in certain instances it may be desirable for an operator to use manual control and work machine 10 may thus include apparatus for this purpose. The locking state of differential 60 may be adjusted via a clutch actuator 61 configured to lock and unlock differential 60 via engagement or disengagement of a clutch (not shown). Clutch actuator 61 may be operated via an electro-hydraulic control valve (not shown), for example. A communication line 63 may connect actuator 61 with clutch actuator 61 for this purpose.

Work machine 10 may further include a variety of sensors, including a wheel steering angle sensor 31 configured to sense a wheel steering angle of work machine 10 via sensing of an angle of front wheels 76 with respect to a portion of front frame unit 12. Sensor 31 may be coupled with electronic controller 50 via another communication line 33. A ground speed sensor 90 may also be provided, and coupled with electronic controller 50 via yet another communication line 91. An articulation angle sensor 42 may be coupled with articulation apparatus 40 and coupled with electronic controller 50 via yet another communication line 43. Work machine 10 may also include a transmission 52 having at least two forward gears, and a transmission gear sensor 54 coupled with electronic controller 50 via a communication line 55. Work machine 10 may still further include wheel slip sensors 70 operable to sense a wheel slip condition of work machine 10, and coupled with electronic controller 50 via another communication line 71.

Steering device 18 may be coupled with electronic controller 50 via a communication line 21. It is contemplated that sensor inputs from wheel steering sensor 32 and articulation angle sensor 42 may be used by electronic controller 50 to determine a steering radius of work machine 10, as described herein, however, sensor inputs from a steering wheel or steering joystick position sensor (not shown) and an articulation angle control device (also not shown) could instead be used. Directly sensing steering radius is also contemplated. Moreover, while it is contemplated that steering radius will actually be calculated in certain embodiments, in other embodiments mapped steering radius values corresponding with sensed wheel steering and/or articulation angles might also be used. The significance of steering radius in the context of the present disclosure will be further apparent from the following description.

The present disclosure further provides a method of operating an articulated work machine such as work machine 10. The method may include determining a value indicative of an articulation angle of work machine 10, for example, via articulation angle sensor 42. As used herein, the term "value indicative of" should be understood to mean direct measurements of the quantity or characteristic of interest, as well as indirect measurements, for example of a different quantity or characteristic having a known relationship with the quantity or characteristic of interest. The method may further include determining another value indicative of a wheel steering angle of work machine 10 that is separate from the articulation angle, for example, via wheel steering sensor 32. The values indicative of wheel steering and articulation angle are described herein as being separate to emphasize that instantaneous wheel steering angle and articulation angle are separate operational characteristics of work machine 10.

The method may further include controlling a locking state of differential 60 responsive to a steering radius thereof. It is contemplated that work machine 10 may, but need not, operate in a default locked differential state. Control over either or both of locking and unlocking of differential 60 may take place based upon the steering radius of work machine 10, as described herein.

Figure 2:
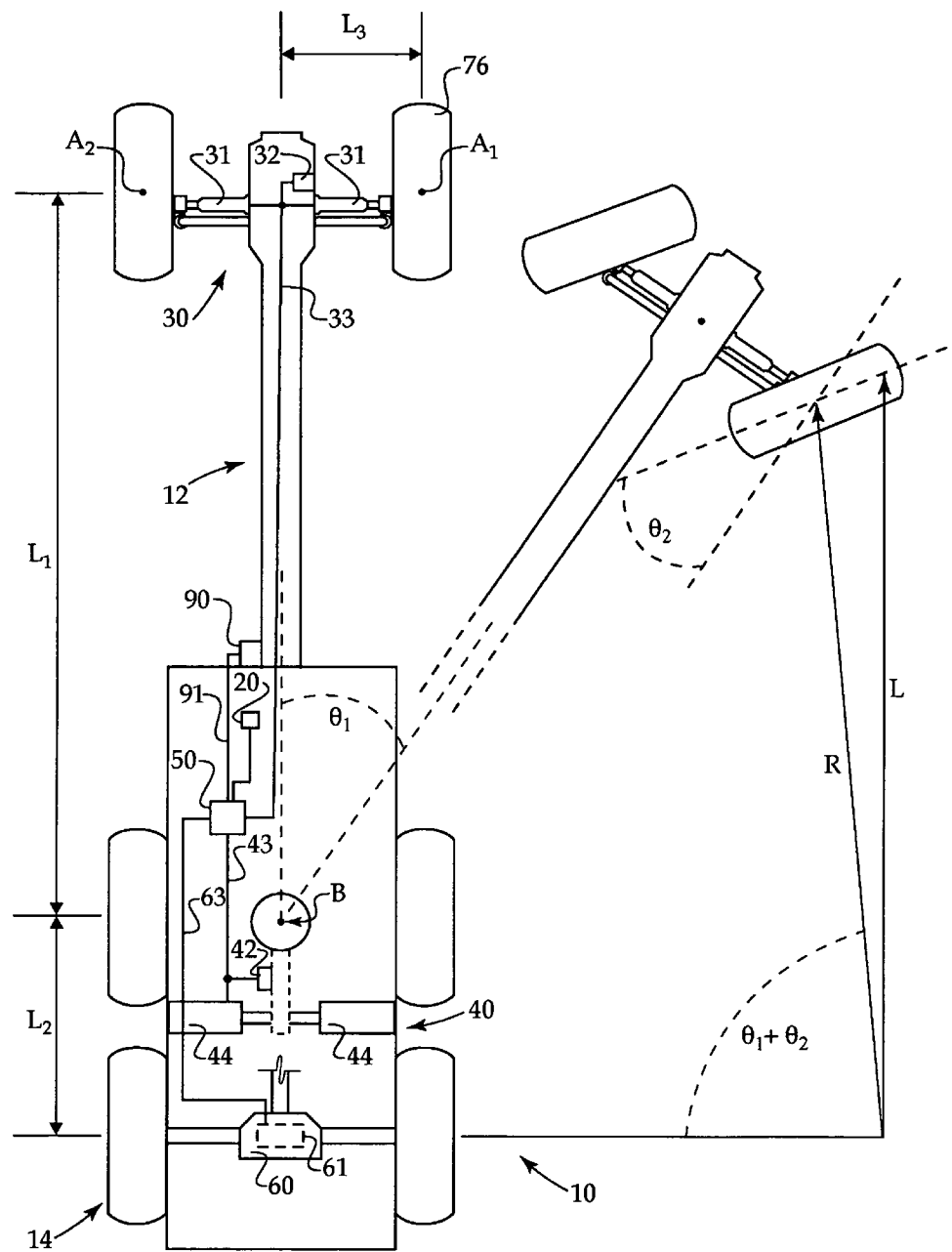
FIG. 2 is a diagrammatic top view of a motor grader work machine, illustrating a front frame unit of the work machine in two different orientations relative to a back frame of the work machine.

As alluded to above, steering radius may be calculated by electronic controller 50 in real time, utilizing inputs from sensors 32 and 42, for example. Referring to FIG. 2, there is shown work machine 10 in a first, straight orientation, as well as a second, turning orientation as might be dictated by both wheel steering and articulation angle adjustment. Also illustrated in FIG. 2 are certain values useful in calculating steering radius based upon a known articulation angle $\Theta_1$ and a known wheel steering angle $\Theta_2$ where several known length dimensions of work machine 10 are also known. In FIG. 2, $L_1$ and $L_2$ represent lengths of front frame unit 12 and back frame unit 14, respectively. $L_3$ represents a length from an approximate centerline of work machine 10 (not shown) to a center of the right front wheel. R represents the steering radius, to be determined, and L represents a length dimension, also to be determined, approximately parallel the longitudinal centerline of work machine 10 between front and rear axles at their closest point when work machine 10 is in a turning orientation.

Calculation of R may take place by dividing L by $\sin(\Theta_1+\Theta_2)$, as the quotient of this term is equal to steering radius R. L may be determined by way of its relationship with $L_1$, $L_2$ and $L_3$ via the equation $L=L_2+L_1 \cos(\Theta_1)-L_3 \sin(\Theta_1)$. Thus, where front wheel steering angle and articulation angle are known, and the various length dimensions are known, steering radius may be readily calculated. Calculation of the steering radius, R, via the presently described method is applicable regardless of whether work machine 10 is steered by wheel steering only, articulation angle only, or by both wheel steering and articulation. Further, even where work machine 10 is operated in a crab mode, wherein wheel steering and articulation are in different directions (one a positive angle and one a negative angle), the above calculation will allow determination of steering radius, which in turn may be used in controlling the locking state of work machine 10, as described herein. It should be appreciated that while calculation of steering radius provides an elegant, relatively precise parameter upon which to base differential locking and unlocking, estimates might instead be used. Similarly, in certain embodiments steering radius need not be calculated but might be inherently embedded into a multidimensional map having wheel steering and articulation angle coordinates corresponding with steering radii.

The method of the present disclosure may further include the step of determining a minimum steering radius for a locked differential state. The step of controlling a locking state of differential 60 may also comprise commanding unlocking of differential 60 with electronic controller 50 responsive to the actual steering radius being less than or equal to the determined minimum steering radius. In other words, where an operator turns work machine 10 with differential 60 locked, electronic controller 50 may command unlocking of differential 60 if and when the steering radius becomes equal to or less than the minimum steering radius. Likewise, in certain embodiments, electronic controller 50 may command re-locking of differential 60 when the steering radius returns to a value greater than the minimum steering radius as the operator turns the machine back closer to straight line travel.

The minimum steering radius may be determined upon the basis of a variety of factors. It is also contemplated that in certain embodiments, minimum steering radii for a given set of operating parameters may be determined via at least one map. Thus, a map, having a plurality of minimum steering radii for different sets of operating conditions of work machine 10, may be referenced by electronic controller 50. Alternatives to a map are contemplated, however, and electronic controller 50 could instead be configured to calculate all the pertinent parameters relating to the minimum steering radius in real time rather than relying upon a map. It should still further be appreciated that rather than calculating or referencing mapped minimum steering radii values, a predetermined minimum steering radius might be used which is considered to be suitable for all operating conditions.

Where minimum steering radius is varied based on operating conditions, however, as will typically be the case, ground speed, as may be determined for example via inputs to electronic controller 50 from ground speed sensor 90, may be incorporated into the minimum steering radius determination. Generally, the higher the ground speed, the larger the minimum steering radius at which a locked differential state will be appropriate. Turning work machine 10 with a locked differential at relatively greater ground speeds may induce relatively greater stresses and wear on various work machine components at a given steering radius than turning at relatively lower ground speeds at the same steering radius. Thus, in one embodiment, electronic controller 50 may receive a sensed ground speed signal, then determine a minimum steering radius in response thereto. In a related embodiment, a maximum ground speed might be determined above which differential locking will never be allowed, regardless of steering radius. A maximum transmission gear at which a locked differential will be allowed could also be used, for example, by way of inputs to electronic controller 50 from sensor 54.

Another operating parameter which may affect the minimum steering radius for a locked differential condition may be a rollover stability condition of work machine 10. Rollover stability may be determined on the basis of inclination, orientation of work machine 10 relative to an incline, ground speed and sensed articulation angle and wheel steering angle, for example. Instead of, or in addition to, the use of ground speed alone to determine a minimum steering radius, the operating factor of concern may be the tendency for work machine 10 to roll over. For relatively greater ground speeds or higher degrees of inclination rollover stability may tend to be relatively lower for a given articulation angle and wheel steering angle. For example, where an operator is driving work machine 10 across a sloped surface at a relatively high ground speed, and attempts a relatively tight uphill turn, he could conceivably flip the machine. At relatively lesser ground speeds, less steep inclines, etc., rollover stability may be relatively greater for a given articulation angle and wheel steering angle. Hence, the minimum steering radius may be varied based on rollover stability at any given moment, which generally relates to mass properties of individual work machines.

Rollover stability may be determined in real time, for example, by sensing the proportion of the weight and any other loads on work machine 10 that is supported by each of its wheels. Where the left or right wheels, for example, appear to be supporting a greater proportion of the weight of work machine 10 than is considered appropriate, an undesired rollover stability condition may exist. A similar real time determination might be made by sensing ground speed, wheel steering and articulation angles and inclination, then calculating a relative likelihood of rollover.

Rollover stability may also be determined on the basis of known relationships between articulation angle, wheel steering angle, inclination and ground speed, for example. In such a case, a minimum steering radius map could include a rollover stability coordinate associated with sensed ground speed, inclination, and articulation and wheel steering angles. Thus, rather than calculating rollover stability in real time, electronic controller 50 could utilize sensor inputs to determine rollover stability via a map, and then responsively determine the minimum steering radius. Such a map could be developed via experimental data via modeling, or both, for a certain class of work machines, for example. In one embodiment, the map could be populated via a series of tests on a motor grader, for example, equipped with the various sensors necessary to determine rollover stability for different sets of operating conditions. For example, tests could be conducted on a motor grader travelling at various ground speeds, on various inclines, and executing a series of turns with articulation angle and wheel steering angle set at different values. The combinations of the various sensed operating factors impart a likelihood of work machine rollover may then be recorded and used to populate a map. Computer simulation of varying conditions and their effect on rollover stability could also be undertaken instead of, or in addition to, deriving empirical data.

The minimum steering radius may further be determined on the basis of indicia of stress on work machine 10. As used herein, the term "indicia of stress" should be understood as broadly referring to any measurable or observable quantity or quality that may directly or indirectly cause or influence work machine 10 or a portion thereof to experience undesired mechanical stress, strain or wear. Determining indicia of stress should be understood as determining that conditions exist where work machine 10 will possibly experience a level of stress, strain or wear that is unacceptable. This determination may be made by sensing certain operating parameters indicative of stress conditions of work machine 10, as described herein. The present disclosure will therefore broadly allow minimum steering radii for work machine 10 to be determined based on the extent to which selected parts of the machine are stressed during operation, or the specific types of stress or wear which it experiences. It should be appreciated that the specific types of stress, strain, wear, etc. that are of concern will depend upon the type and specifications of the particular work machine, as well as its intended operating environment.

It has been found that motor graders, for example, due to their design and use may be relatively more likely than certain other types of work machines to experience significant stress on the frame and articulation apparatus, collectively "frame stress." The use of a relatively long front frame unit in a motor grader can result in that portion of the work machine being subjected to substantial forces during operation, in particular when the machine is articulated. In addition, the significant length of the front frame unit can further result in relatively larger stresses being imparted to other components of the machine, as the long front frame unit can act as a relatively large lever arm. When a motor grader is articulated and turned with the differential locked, the resultant stresses can in some instances be sufficient to actually break or deform the front frame unit, articulation apparatus or other components. Other types of work machines will likely have different stress considerations related to locked differential turning.

It should be appreciated that real time determinations of indicia of stress on work machine 10, such as frame stress, may be used in determining the minimum steering radius, for example, by sensing operating parameters indicative of certain stress conditions of work machine 10 during operation. To this end, work machine 10 might be equipped with one or more strain gauges (not shown) configured to sense the relative strain on selected components of front frame unit 12, back frame unit 14 or articulation apparatus 40 during operation. If, during a turn, the sensed stress on the measured parts of the machine becomes excessive, differential 60 might be unlocked, or prevented from locking.

It is contemplated, however, that while real time determinations of frame stress may be undertaken, a practical implementation strategy might be to utilize indicia of stress, and related operating parameters, in populating a minimum steering radius map. Thus, the minimum steering radius map referenced by electronic controller 50 may include a frame stress coordinate for a given set of operating conditions, which has been empirically, or by simulation, associated with a given set of operating conditions. One or more operating parameters that are associated with the particular frame stress condition(s) may be sensed during operation to alert electronic controller 50, for example via a map, that the minimum steering radius should be set to a particular value. Similar to rollover stability, the level of frame stress may depend upon such factors as ground speed, and articulation and wheel steering angles, or other factors.

Powertrain stress may represent another area of concern affecting minimum steering radii. The presently described method may thus include sensing an operating parameter indicative of powertrain stress on work machine 10. In one embodiment, the operating parameter indicative of powertrain stress may include an operating parameter indicative of a torque through at least a portion of the powertrain of work machine 10. A sensed value indicative of torque may be used in determining a minimum steering radius, for example, a value inputted to electronic controller 50 from a torque sensor operably coupled with a portion of the powertrain. Certain stresses through the powertrain of work machine 10 will be inherent during any operation. However, where work machine 10 is turned, relatively higher stresses through the powertrain, including the axles, driveshaft, differential, and various powertrain gears, etc. may occur where differential 60 is locked as compared to unlocked. To this end, work machine 10 may include a torque sensor (not shown) coupled with its transmission input or output shaft or with another portion of the powertrain. Powertrain stress conditions may be determined in real time, similar to the above described frame stress condition, however, it is again contemplated that using mapped values for minimum steering radii which correspond with certain operating parameters associated with powertrain stress may provide a practical implementation strategy. The relative levels of powertrain stress under certain conditions may be determined empirically on test machines and/or via simulation, and then used to populate a map.

Powertrain stresses may in turn vary based on the steering radius of work machine 10. Hence, in order to keep powertrain stresses within reasonable bounds, the minimum steering radius for a locked differential state may be relatively greater where powertrain stresses are relatively large, and relatively lower where powertrain stresses are relatively lower. Transmission gear may also affect the powertrain stresses, and thus one sensed operating parameter indicative of powertrain stress, and also associated with torque through the powertrain, may be transmission gear.

The method may still further include determining a wheel slip condition of work machine 10, and commanding locking of differential 60 responsive to a determined wheel slip. Work machine 10 may thus utilize wheel slip sensors 70 to determine that a wheel is slipping by comparing the sensed rotational speed with an expected speed for a given ground speed, for example. Commanding locking of differential 60 responsive to a wheel slip condition may also include commanding locking, unless a locking unsuitability condition exists. In other words, if locking unsuitability conditions such as a frame stress condition, a rollover stability condition, a powertrain stress condition, or other conditions such as the steering radius being less than the minimum radius exist, then locking of differential 60 may be inhibited. As stated above, work machine 10 may have a manual mode wherein an operator can selectively command locking or unlocking of differential 60, for example via a control signal from operator input device 20. Electronic controller 50, however, may be configured to override the operator requested control signal if a locking unsuitability condition is present.

Electronic controller 50 may be configured, for example, via a control algorithm, to control at least one of locking and unlocking of differential 60 responsive to the steering radius of work machine 10. Electronic controller 50 may thus include a computer readable medium such as RAM, ROM or another suitable medium whereupon a differential locking state control algorithm is recorded. In some embodiments, dedicated hardware may perform part of the differential locking control rather than solely software. Electronic controller 50 may further be configured to determine indicia of stress on work machine 10. As described herein, "determining" indicia of stress should not be understood to mean that electronic controller 50 must determine such indicia in real time. In other words, the indicia of stress may be determined via a map wherein stress conditions having a known relationship to certain sensed operating parameters may be determined. Electronic controller 50 may further be configured to generate a differential unlocking control signal to differential 60 where a determined steering radius is less than or equal to a minimum steering radius, also determinable by electronic controller 50. Thus, electronic controller 50 may compare the determined steering radius with the minimum steering radius for a given set of operating conditions.

INDUSTRIAL APPLICABILITY

Turning of work machine 10 will typically take place via operator control of steering device 18 and also via operator control of articulation apparatus 40. When steering device 18 is adjusted, electronic controller 50 will send a control signal to wheel steering apparatus 30 such that actuators 31, such as hydraulic cylinders, move appropriately to rotate wheels 76 about their respective axes $A_1$ and $A_2$. The operator may simultaneously actuate a control device to adjust an articulation angle of work machine 10, such that actuators 44, such as hydraulic cylinders, move appropriately to position front frame unit 12 at an angle relative to back frame unit 14, about axis B.

As described herein, differential 60 may be normally biased toward a locked state, but could instead have a default unlocked state. In an automated differential locking control mode, as the operator turns work machine 10, ground speed sensor 90 may be inputting a ground speed signal to electronic controller 50. Wheel steering angle sensor 32 and articulation angle sensor 42 will also typically be inputting signals to electronic controller 50. Electronic controller 50 may thereby determine or estimate the actual steering radius of work machine 10 in real time. Responsive to the pertinent inputted signal values from various sensors, also described herein, electronic controller 50 may determine a minimum steering radius for a locked differential state of work machine 10. This feature allows steering radius to be based on operating conditions in at least certain embodiments. If the determined steering radius becomes equal to or less than the minimum steering radius, electronic controller 50 may generate a differential unlocking control signal to actuator 61 to unlock differential 60. If the operator subsequently returns work machine 10 to a condition where the actual steering radius is greater than a minimum steering radius, electronic controller 50 may generate a differential locking control signal to actuator 61 to return differential 60 to a locked state. Alternatively, re-locking of differential 60 could be based solely on an operator command. Where work machine 10 is in a manual differential locking control mode, electronic controller 50 may perform many of the same operations, however, it may override an operator's attempts at locking differential 60 if a locking unsuitability condition is present, as described herein.

Figure 3:
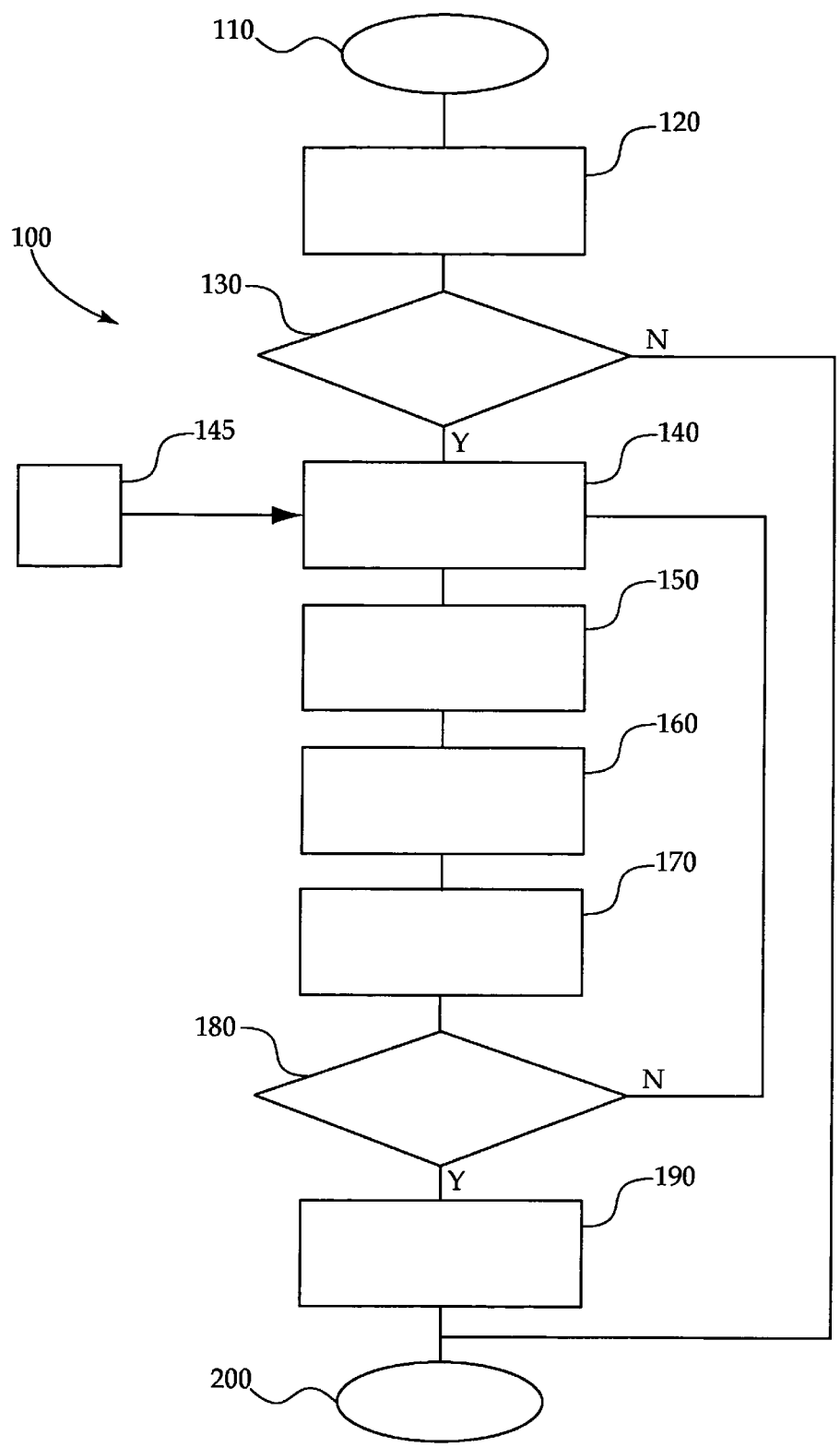
FIG. 3 is an exemplary control process according to the present disclosure.

Turning to FIG. 3, there is shown an exemplary control process 100 for controlling the locking state of differential 60. Control process 100 will typically begin at a START 110, and thenceforth proceed to STEP 120 wherein turning of work machine 10 is initiated. From STEP 120, the process may proceed to STEP 130 wherein electronic controller 50 may query whether differential 60 is locked. If the differential is not locked at STEP 130, the process may proceed to STEP 200, FINISH. If the differential is locked at STEP 130, the process may proceed to STEP 140, wherein electronic controller 50 may determine a minimum steering radius, as described herein. The determination at STEP 140 may include referencing at least one map 145, as described herein.

From STEP 140, the process may proceed to STEP 150 wherein electronic controller 50 may determine an articulation angle of work machine 10 by sensing the same with sensor 42. From STEP 150, the process may proceed to STEP 160 wherein electronic controller 50 may sense a wheel steering angle of work machine 10 via sensor 32. From STEP 160, the process may proceed to STEP 170 wherein electronic controller 50 may determine the steering radius of work machine 10. From STEP 170, the process may proceed to STEP 180 wherein electronic controller 50 may compare the determined steering radius with the minimum steering radius.

In particular, at STEP 180, electronic controller 50 may query whether the determined steering radius is less than or equal to the minimum steering radius. If at STEP 180, the determined steering radius is less than or equal to the minimum steering radius, the process may proceed to STEP 190 wherein electronic controller 50 may output a control signal to unlock differential 60 and then to FINISH 200. If, at STEP 180, the determined steering radius is not less than the threshold steering radius, the process may return to STEP 140, wherein electronic controller 50 will again determine the minimum steering radius.

Figure 4:
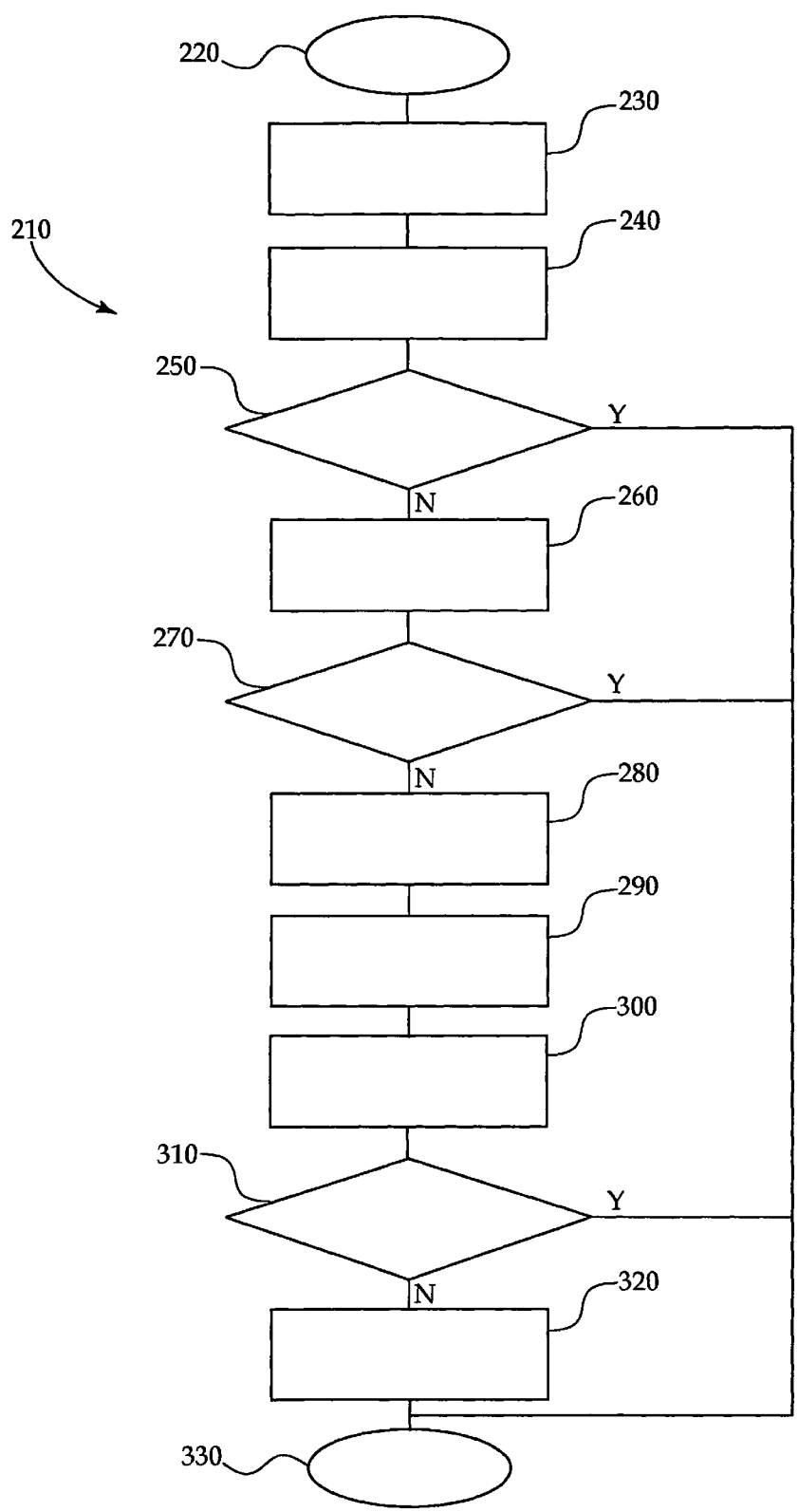
FIG. 4 is another exemplary control process according to the present disclosure.

Turning to FIG. 4, there is shown another exemplary control process 210 according to the present disclosure. Control process 210 is exemplary of a manual differential locking control mode, wherein electronic controller may override an operator's attempts at locking differential 60 under certain conditions. Control process 210 may begin at START 220, and thenceforth proceed to STEP 230 wherein electronic controller 50 receives a differential locking control signal, for example, a control signal from operator input device 20 to lock differential 60. From STEP 230 the process may proceed to STEP 240, wherein electronic controller 50 may determine the ground speed of work machine 10, for example via ground speed sensor 90. From STEP 240, the process may proceed to STEP 250 wherein electronic controller 50 may query whether the determined ground speed is greater than a ground speed limit. If yes, the process may proceed to FINISH 330 without locking differential 60. If, at STEP 250 the ground speed is not greater than the ground speed limit, the process may proceed to STEP 260 wherein electronic controller 50 may determine the gear of work machine 10. From STEP 260, the process may proceed to STEP 270 wherein electronic controller 50 may query whether the determined gear is greater than a low gear. If yes, the process may proceed to FINISH 330 without locking differential 60. If no, the process may proceed to STEP 280.

In STEP 280, electronic controller 50 may determine the work machine wheel steering angle. For instance, via an input from wheel steering angle sensor 32. From STEP 280, the process may proceed to STEP 290 wherein electronic controller 50 may determine the articulation angle of work machine 10. For example, via articulation sensor 42. From STEP 290, the process may proceed to STEP 300, wherein electronic controller 50 may determine the work machine steering radius. From STEP 300, the process may proceed to STEP 310, wherein electronic controller 50 may query whether the steering radius is less than or equal to a minimum steering radius. If at STEP 310 the steering radius is less than or equal to the minimum steering radius, the process may proceed to FINISH 330. If at STEP 310 the answer is no, the process may proceed to STEP 320 wherein electronic controller 50 may output a control signal to differential 60, adjusting actuator 61 to lock differential 60. From STEP 320, the process may proceed to FINISH 330.

The present disclosure thus provides a differential locking control method and apparatus that utilizes steering radius to determine whether differential locking is appropriate. For instance, steering radius may be used to determine whether differential 60 should be locked, unlocked or whether an operator's attempts to lock differential 60 should be overridden in certain situations. The use of steering radius provides a more elegant approach than certain earlier designs such as Kenji, discussed above, for a variety of reasons. In most instances, steering radius will be more closely associated with the various stresses on the work machine than either of wheel steering angle or articulation angle alone. For example, where simple threshold angles for wheel steering and articulation are used, differential locking may be allowed in instances where it should not be, and may be disallowed in situations that are suitable to a locked differential. Further, the use of steering radius is applicable in all modes, dispensing with the requirement in some earlier designs that differences in direction of articulation and wheel steering angle must be accounted for. Consequently, implementation of a differential locking control system and method according to the present disclosure will allow increased operating efficiency as compared to certain earlier designs. Improved efficiency, however, will not have the undesired result of undue stress, strain, wear, etc. on the work machine, as the present disclosure recognizes heretofore unknown factors that bear on the suitability or unsuitability of different conditions for differential locking and unlocking.

The present description is for illustrative purposes only, and should not be construed to narrow the breadth of the present disclosure in any many. Thus, those skilled in the art will appreciate that various modifications might be made to the presently disclosed embodiments without departing from the intended spirit and scope of the present invention. For instance, while the present disclosure is discussed largely in the context of a motor grader, it is not thereby limited. Virtually any articulated machine having a lockable differential may benefit from the teachings herein. Other aspects, features and advantages would be apparent on an examination of the attached drawing figures and appended claims.

What is claimed is:

1. A method of operating an articulated machine comprising the steps of:
    determining a first value indicative of an articulation angle of the machine;
    determining a second value indicative of a wheel steering angle of the machine that is separate from the articulation angle;
    determining a steering radius of the articulated machine based in part upon the first value and the second value; and
    controlling a locking state of a differential of the machine responsive to the determined steering radius thereof.

2. The method of claim 1 further comprising the step of determining a minimum steering radius for a locked differential state, wherein the step of controlling a locking state of the differential comprises commanding unlocking of the differential responsive to the steering radius being less than or equal to the minimum steering radius.

3. The method of claim 2 comprising the step of operating the machine with the differential in a default locked state.

4. The method of claim 2 further comprising the step of sensing a ground speed of the machine, wherein:
    the step of determining a value indicative of an articulation angle includes sensing an articulation angle between front and back frame units of the machine;
    the step of determining a value indicative of a wheel steering angle includes sensing a wheel steering angle between front wheels of the machine and a portion of the front frame unit; and
    controlling a locking state of the differential includes controlling the locking state responsive to the sensed ground speed.

5. The method of claim 4 further comprising the step of determining a rollover stability condition of the machine based at least in part on sensed ground speed and sensed articulation and wheel steering angles, wherein the step of determining a minimum steering radius for a locked differential state includes determining a minimum steering radius that is based at least in part on the determined rollover stability condition.

6. The method of claim 4 further comprising the step of determining indicia of stress on the machine, wherein the step of determining a minimum steering radius for a locked differential state includes determining a minimum steering radius that is based at least in part on the determined indicia of stress.

7. The method of claim 6 wherein the step of determining indicia of stress on the machine comprises a step of sensing at least one operating parameter indicative of a stress condition of the machine.

8. The method of claim 7 wherein the step of sensing at least one operating parameter indicative of a stress condition of the machine includes sensing an operating parameter indicative of powertrain stress of the machine.

9. The method of claim 8 wherein sensing at least one operating parameter indicative of powertrain stress includes sensing at least one operating parameter indicative of torque through at least a portion of the powertrain of the machine.

10. The method of claim 7 wherein the step of sensing at least one operating parameter indicative of a stress condition of the machine includes sensing at least one operating parameter indicative of frame stress on the machine.

11. The method of claim 6 wherein determining indicia of stress on the machine includes mapping at least one set of operating parameter values associated with a stress condition of the machine to minimum steering radii.

12. The method of claim 11 further comprising the step of determining a wheel slip condition of the machine, wherein the step of controlling a locking state of the differential comprises commanding locking of the differential responsive to the determined wheel slip condition, unless a locking unsuitability condition exists.

13. The method of claim 12 further comprising the step of receiving an operator requested differential locking control signal, wherein the step of controlling a locking state of the differential comprises overriding the control signal, if a locking unsuitability condition is present, including at least one of a frame stress condition, a powertrain stress condition, a steering radius condition and a rollover stability condition.

14. An articulated machine comprising:
a front frame unit including a wheel steering apparatus operable to steer the machine;
a back frame unit coupled with the front frame unit and including a lockable differential;
an articulation apparatus coupled between the front and back frame units and also operable to steer the machine;
a first sensor configured to monitor a first parameter indicative of a wheel steering angle of the machine;
a second sensor configured to monitor a second parameter indicative of an articulation steering angle of the machine; and
an electronic controller in communication with the first sensor and the second sensor and being configured to determine a steerin radius of the machine based in part on inputs from the first sensor and the second sensor, the electronic controller further being configured to control at least one of locking and unlocking of the differential responsive to the determined steering radius of the machine.

15. The machine of claim 14 wherein said electronic controller is configured to determine indicia of stress on said machine, and to determine a minimum steering radius based at least in part thereon, said electronic controller further being configured to generate a differential unlocking control signal to said differential where the determined steering radius is less than or equal to the minimum steering radius.

16. The machine of claim 15 wherein said electronic controller is further configured to determine the minimum steering radius at least in part via a map having a first coordinate associated with an operating parameter of said machine, a second coordinate associated with at least one stress condition of said machine and a third coordinate associated with minimum steering radii for said machine.

17. The machine of claim 15 further comprising:
a wheel steering sensor and an articulation sensor coupled with said electronic controller and configured to sense a wheel steering angle and an articulation angle, respectively, of said machine; and
a ground speed sensor and a transmission gear sensor, each coupled with said electronic controller;
wherein said electronic controller is configured to determine a steering radius of said machine via inputs from said wheel steering and articulation sensors, and configured to determine said indicia of stress on said machine at least in part via inputs from said wheel steering sensor, said articulation sensor, said ground speed sensor and said transmission gear sensor.

18. The machine of claim 17 further comprising a wheel slip sensor coupled with said electronic controller, wherein said electronic controller is configured to generate a differential locking command to said differential unless a locking unsuitability condition corresponding with said indicia of stress is satisfied.

19. An electronic controller configured to determine a steering radius of an articulated machine based in part upon a first input indicative of a wheel steering angle and a second input indicative of an articulation steering angle, the electronic controller being further configured to control a locking state of a differential in the articulated machine responsively to comparison of the determined steering radius with a minimum steering radius, the minimum steering radius being based at least in part on stress indicia associated with at least one machine operating parameter different from the wheel steering angle and the articulation steering angle.

20. The electronic controller of claim 19 wherein the at least one machine operating parameter includes a range of possible parameter values, said electronic controller further being configured to vary the minimum steering radius responsive to a value of said machine operating parameter.

* * * * *